United States Patent
Jeong

(10) Patent No.: US 7,914,061 B2
(45) Date of Patent: Mar. 29, 2011

(54) APPARATUS FOR LOCKING DOUBLE-FOLDING SEAT FOR VEHICLES

(75) Inventor: Chan Ho Jeong, Seoul (KR)

(73) Assignee: Hyundai Motor Company, Seoul (KR)

( * ) Notice: Subject to any disclaimer, the term of this patent is extended or adjusted under 35 U.S.C. 154(b) by 150 days.

(21) Appl. No.: 12/323,275

(22) Filed: Nov. 25, 2008

(65) Prior Publication Data

US 2009/0152889 A1  Jun. 18, 2009

(30) Foreign Application Priority Data

Dec. 18, 2007 (KR) .................. 10-2007-0133183

(51) Int. Cl.
*B60N 2/10* (2006.01)
(52) U.S. Cl. .............. 296/65.05; 296/65.06; 297/324; 297/326; 297/335
(58) Field of Classification Search .......... 296/65.05, 296/65.09, 65.16; 297/316, 324, 326, 336, 297/335, 344.1
See application file for complete search history.

(56) References Cited

U.S. PATENT DOCUMENTS

| | | | | |
|---|---|---|---|---|
| 1,952,376 A | * | 3/1934 | Knabusch et al. | 297/326 |
| 5,240,302 A | * | 8/1993 | Yoshida et al. | 296/65.09 |
| 5,364,152 A | * | 11/1994 | Mastrangelo et al. | 296/65.03 |
| 5,743,596 A | * | 4/1998 | Chabanne | 297/463.1 |
| 5,882,061 A | * | 3/1999 | Guillouet | 296/65.05 |
| 6,000,742 A | * | 12/1999 | Schaefer et al. | 296/65.09 |
| 6,079,763 A | * | 6/2000 | Clemente | 296/65.05 |
| 6,688,666 B2 | * | 2/2004 | Neale et al. | 296/65.09 |
| 6,902,234 B2 | * | 6/2005 | Becker et al. | 297/216.1 |
| 6,966,598 B2 | * | 11/2005 | Schmale | 296/65.08 |
| 7,309,095 B2 | * | 12/2007 | O'Connor | 296/65.03 |
| 7,338,118 B2 | * | 3/2008 | Ichikawa et al. | 297/216.1 |
| 7,503,613 B2 | * | 3/2009 | Holdampf | 296/65.05 |
| 7,517,020 B2 | * | 4/2009 | Yokota | 297/344.15 |
| 7,681,953 B2 | * | 3/2010 | Van Druff et al. | 297/327 |
| 2009/0189408 A1 | * | 7/2009 | DeVoss et al. | 296/65.08 |

* cited by examiner

Primary Examiner — Jason S Morrow
(74) Attorney, Agent, or Firm — Morgan, Lewis & Bockius LLP

(57) ABSTRACT

An apparatus for locking a double-folding seat for vehicles includes a latch plate, a guide unit, a release lever unit and a locking pin. The latch plate has a locking notch therein and is fastened to a seat frame. The guide unit is fitted over a folding shaft of the seat frame at a position spaced apart from the latch plate. The release lever unit is provided on the folding shaft so as to be rotatable. The locking pin is elastically connected to the release lever unit such that the locking pin is locked to the locking notch of the latch plate when the seat frame is folded. Furthermore, when the release lever unit is rotated, the release lever unit pushes the locking pin, so that the locking of the locking pin to the locking notch of the latch plate is released.

18 Claims, 7 Drawing Sheets

APPARATUS FOR LOCKING DOUBLE-FOLDING SEAT FOR VEHICLES

CROSS-REFERENCE TO RELATED APPLICATION

The present application claims priority to Korean Patent Application Number 10-2007-0133183 filed Dec. 18, 2007, the entire contents of which application is incorporated herein for all purposes by this reference.

BACKGROUND OF THE INVENTION

1. Field of the Invention

The present invention relates generally to an apparatus for locking a double-folding seat for vehicles which locks a seat frame, which is folded forwards.

2. Description of Related Art

Generally, in vehicles, such as RVs (recreational vehicles) and SUVs (sport utility vehicles), which can accommodate a relatively large number of people, double-folding seats for facilitating the entry and egress of third-row passengers are provided in second rows.

In the case of such a double-folding seat, a seat back is folded forwards, and a seat cushion is thereafter folded forwards. Then, the entire seat enters a state in which it is completely double-folded forwards.

However, in the conventional technique, there is a problem in that, if a vehicle suddenly starts when a double-folding seat is being double-folded or is in a double-folded state, the double-folding seat undesirably moves.

In an effort to overcome the problem experienced with the conventional techniques, a construction in which a separate seat strap for preventing the double-folded seat from undesirably moving is fastened to an assist grip of a vehicle frame was proposed. However, the seat strap is disadvantageous in that the use thereof inconveniences a user, and the appearance in the passenger compartment is marred.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for locking a double-folding seat for vehicles which is constructed such that the seat, which is double-folded, can be smoothly locked or unlocked.

In an aspect of the present invention, an apparatus for locking a double-folding seat for vehicles, may include a latch plate firmly fastened to a seat frame which is rotatably coupled to a base bracket, the latch plate having a locking notch formed at a predetermined position thereof, a guide unit firmly fastened to a folding shaft at a position spaced apart from the latch plate, the guide unit including a guide slot, a release lever unit rotatably coupled to the folding shaft, and/or a locking pin slidably inserted into the guide slot of the guide unit, the locking pin being elastically connected to the release lever unit such that the locking pin is locked to the locking notch of the latch plate when the seat frame is folded, but when the release lever unit is rotated, the release lever unit moves out the locking pin from the locking notch of the latch plate, so that the locking pin is released from the locking notch.

The release lever unit may include a lever plate rotatably provided on the folding shaft, a support pin formed on the lever plate and being connected to the locking pin through an elastic spring, and/or a lever extending outwards from one end portion of the lever plate.

A rack gear may be provided in the latch plate, and a pinion gear may be rotatably provided on the base bracket, the pinion gear engaging with the rack gear. The rack gear may be formed on the latch plate in a predetermined distance from the folding shaft in a rotational direction thereof.

A stopper may be provided on the base bracket to limit a rotation angle of the seat frame at which the seat frame is folded.

A retainer may be provided on an end portion of the locking pin to prevent the locking pin from releasing from the guide unit.

In another aspect of the present invention, an apparatus for locking a double-folding seat for vehicles may include a latch plate firmly fastened to a seat frame which is rotatably coupled to a base bracket, the latch plate having a locking notch formed at a predetermined position in the latch plate, a guide unit firmly fastened to a folding shaft, wherein the guide unit is locked to the latch plate by rotation of the seat frame, and/or a release lever unit rotatably coupled to the folding shaft, wherein the guide unit is unlocked from the latch plate by rotation of the release lever unit.

The latch plate may be firmly fastened to the seat frame through a bushing enclosing a portion of the folding shaft in the base bracket. The locking notch may be formed on the latch plate in a predetermined distance from the folding shaft in a radial direction thereof.

The guide unit may include a guide slot formed in a radial direction from the folding shaft, a locking pin slidably inserted into the guide slot and elastically biased toward the folding shaft by an elastic member, wherein the locking pin is locked to the locking notch of the latch plate by the elastic member when the seat frame is rotated with a predetermined degree so as to fold the seat frame but when the release lever unit is rotated, the release lever unit releases the locking pin from the locking notch of the latch plate.

The locking pin and the release lever unit may be connected by the elastic member. The elastic member may be a spring.

A retainer may be provided on an end of the locking pin to prevent the locking pin from releasing from the guide unit.

The release lever unit may include a lever plate rotatably provided on the folding shaft and a lever extending outwards from one end portion of the lever plate.

A support pin may be formed to the lever plate, the support pin and the locking pin being connected by an elastic member.

A rack gear may be provided in the latch plate, and a pinion gear is rotatably provided on the base bracket, the pinion gear engaging with the rack gear. The rack gear may be formed on the latch plate in a predetermined distance from the folding shaft in a rotational direction thereof.

A stopper may be provided on the base bracket to limit a rotation angle of the seat frame at which the seat frame is folded.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
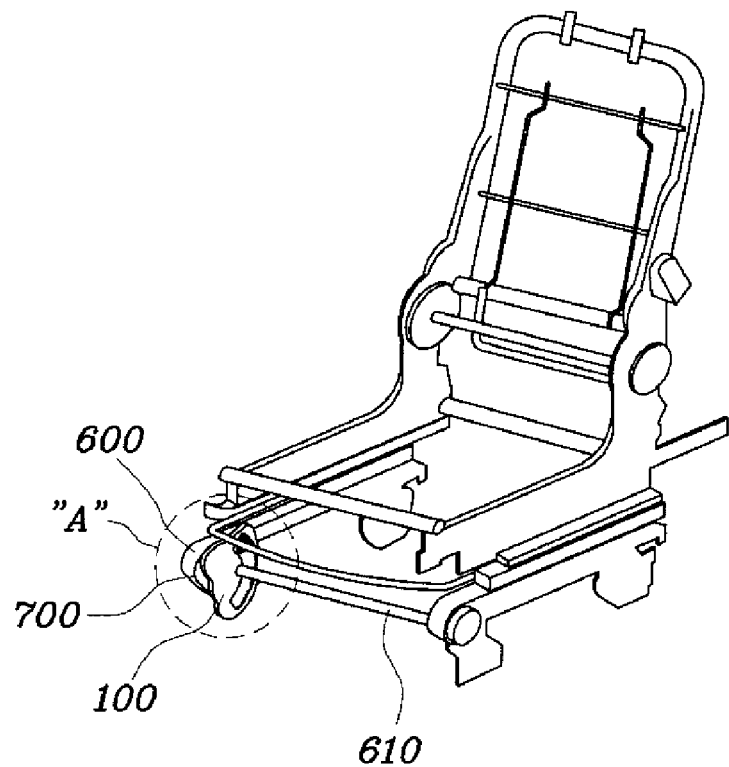
FIG. 1 is a perspective view showing an exemplary locking apparatus for a double-folding seat for vehicles according to the present invention.
Figure 2:
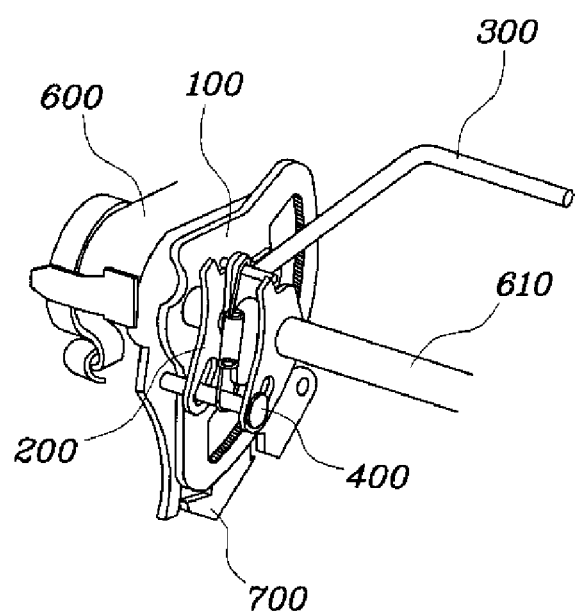
FIG. 2 is an enlarged view of a circled portion "A" of FIG. 1.
Figure 3:
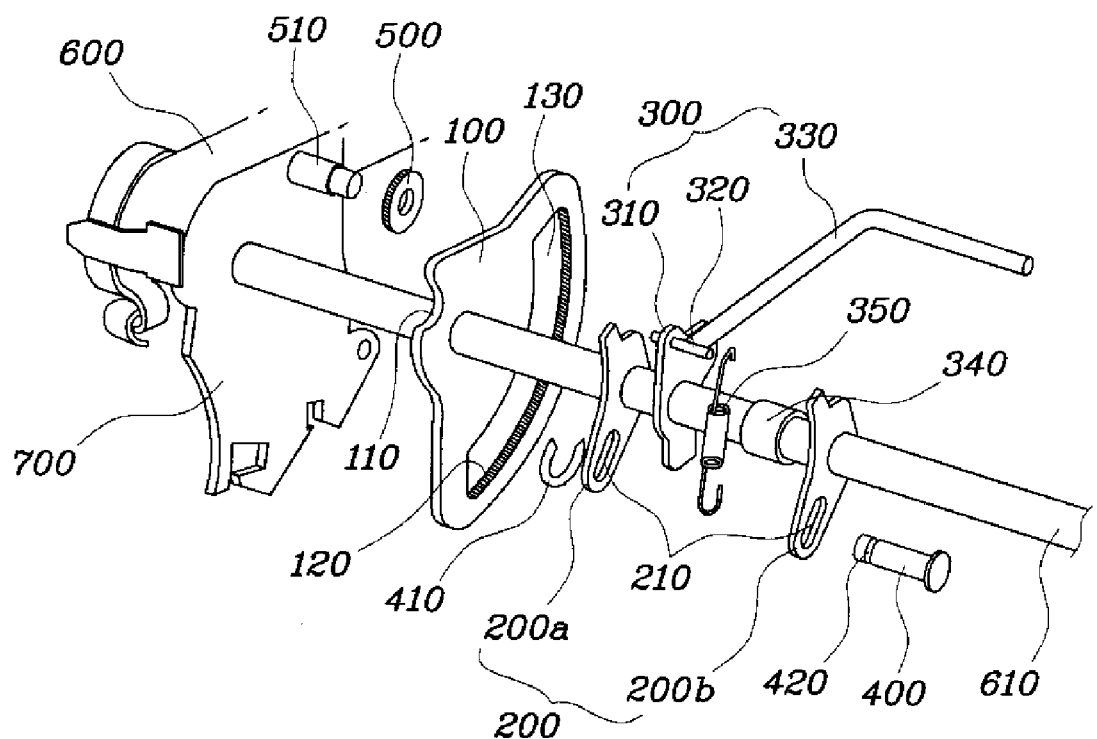
FIG. 3 is an exploded perspective view of the locking apparatus according to the present invention.

As shown in FIGS. 1 through 3, a locking apparatus for a double-folding seat for vehicles is provided at a base bracket 700, which is fastened to a floor panel of a vehicle, and a seat frame 600, which is coupled to the base bracket 700 by a hinge.

The double-folding seat locking apparatus includes a latch plate 100, which is rotatably fitted over a folding shaft 610. The latch plate 100 is firmly connected with a seat frame 600 through the base bracket 700. In one exemplary embodiment of the present invention, a bushing connecting the latch plate 100 with the seat frame 600 may be configured to enclose the folding shaft 610 through the base bracket 700 so that the rotation of the seat frame 600 is transferred to the latch plate 100 through the base bracket 700. The folding shaft 610 is configured to be a stationary member so that the latch plate 100 can be rotated relatively from the folding shaft 610.

The double-folding seat locking apparatus further includes a guide unit 200, which is firmly fitted over the folding shaft 610 at a position spaced apart from the latch plate 100 by a predetermined distance, a release lever unit 300, which is rotatably fitted over the folding shaft 610, and a locking pin 400, which is elastically connected to the release lever unit 300 and selectively coupled to the latch plate.

Since the guide unit 200 is firmly fixed to the stationary member, i.e., the folding shaft 610, the latch plate 100 can be selectively coupled to the guide unit 200 by the locking pin 400 according to rotation of the seat frame 600 as explained hereinafter.

The latch plate 100 is firmly fastened to the seat frame 600 such that, when the seat frame 600 is rotated, the latch plate 100 is rotated along with the seat frame 600 as set forth above.

A locking notch 110 is formed at a predetermined position in the latch plate 100, so that, when the seat frame 600 is completely double-folded, the locking pin 400 is fitted into and locked to the locking notch 110 of the latch plate 100.

The latch plate 100 comprises a sector gear having a latch gear hole 130. A rack gear 120, which will be explained later herein, is formed on the circumferential inner surface of the latch gear hole 130. The rack gear 120 engages with a pinion gear 500, which will be explained later herein, and thus guides the rotation of the latch plate 100 when the seat frame 600 is rotated. The pinion gear 500 is coupled to the base bracket 700 so as to be rotatable using a support pin 510.

Figure 4:
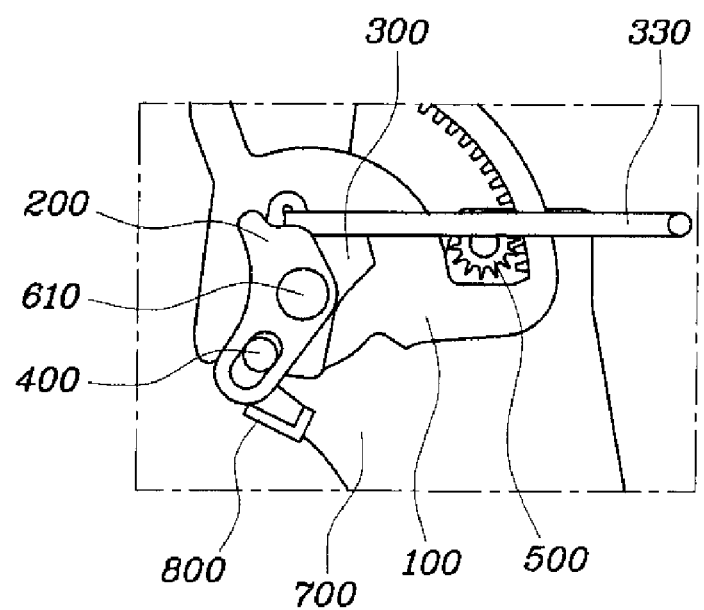
FIG. 4 is a view showing the construction of the locking apparatus having an exemplary stopper according to the present invention.

As shown in FIG. 4, a stopper 800 for limiting the angle at which the seat frame 600 is folded is provided on the base bracket 700.

The guide unit 200 is fitted over the folding shaft 610 and is spaced apart from the latch plate 100 by a predetermined distance. The guide unit 200 has guide slots 210, which extend in the longitudinal direction thereof. The guide unit 200 includes a first guide piece 200a and a second guide piece 200b, which are firmly fitted over the folding shaft 610 at positions spaced apart from each other. The first guide piece 200a and the second guide piece 200b have respective guide slots 210 therein.

The locking pin 400, which is operated in conjunction with the operation of the release lever unit 300, is inserted into the guide slots 210. The locking pin 400 is moved along the guide slots 210 and is releasably locked to the locking notch 110 of the latch plate 100.

To achieve the above-mentioned purpose, the locking pin 400 is provided so as to be slidable along the guide slots 210, and is elastically connected to the release lever unit 300 such that it is locked to the locking notch 110 when the seat frame 600 is folded. A retainer groove 420 is formed in the end of the locking pin 400. A retainer 410 is fitted over the retainer groove 420. The retainer 410 serves to prevent the locking pin 400 from being undesirably removed from the guide slot 210 in the axial direction.

The release lever unit 300 serves to release the state in which the locking pin 400 is locked to the latch plate 100 by completely double-folding the seat frame 600.

The release lever unit 300 includes a lever plate 310, which is fitted over the folding shaft 610 so as to be rotatable with respect to the folding shaft 610 using a bushing 340, and a support pin 320, which is fastened at a predetermined position to the lever plate 310 and is elastically connected to the locking pin 400 through an elastic spring 350. The release lever unit 300 further includes a lever 330, which extends a predetermined length and is fastened to the lever plate 310 to provide rotating force to the lever plate 310.

The lever plate 310 includes a trigger portion convexly protruding toward the locking pin 400.

In detail, in the state in which the locking pin 400 is locked to the locking notch 110 of the latch plate 100, when the lever 330 is rotated in a direction opposite the direction in which the seat frame 600 is folded, so as to unlock the locking pin 400 from the locking notch 110, the lever plate 310 is also rotated by the rotation of the lever 330 in the direction opposite the direction in which the seat frame 600 is folded.

At this time, the trigger portion of the lever plate 310, which rotates, pushes the locking pin 400 outwards along the guide slot 210, which has been locked to the locking notch 110 of the latch plate 100, such that the locking pin 400 is removed from the locking notch 110. Then, the seat frame 600 is released from the locked state, thus entering a state in which the seat frame 600 can be returned to its original position.

The operation of the present invention will be explained in detail with reference to the attached drawings.

Figure 5:
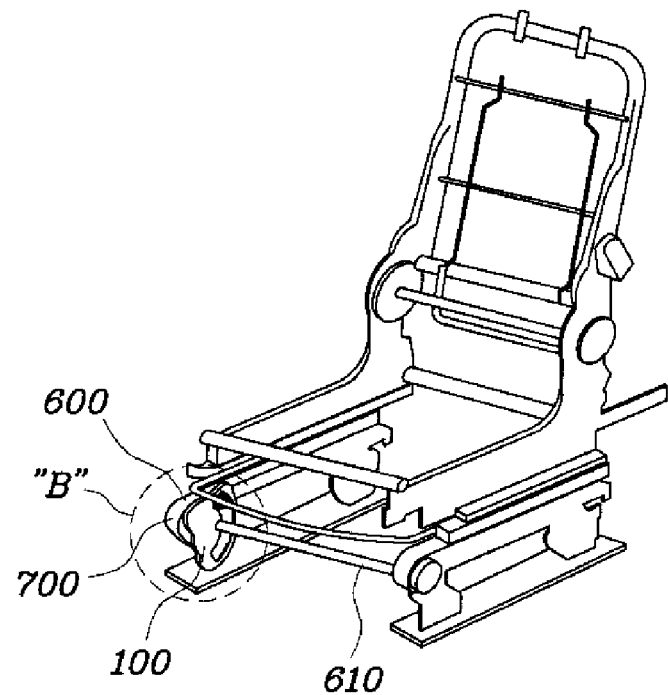
FIG. 5 is a view showing the double-folding seat having the locking apparatus when it is in an unfolded state according to the present invention.
Figure 6:
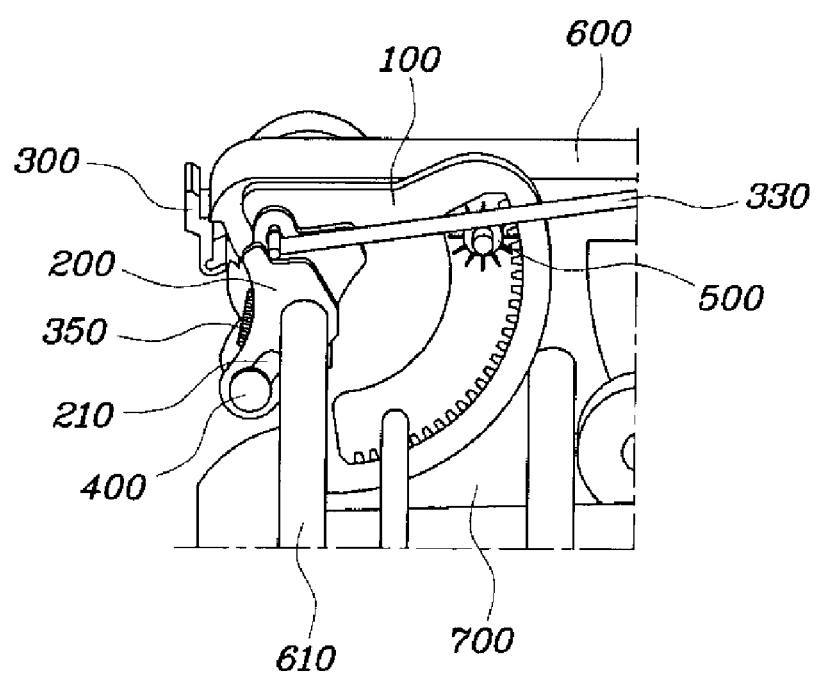
FIG. 6 is an enlarged view of a circled portion "B" of FIG. 5.

As shown in FIGS. 5 and 6, when the seat frame 600 is in the unfolded state, the locking pin 400 is in close contact with a portion of the latch plate 100 and is disposed at the lower positions in the guide slots 210 of the guide unit 200. At this time, the locking pin 400 is maintained in the state in which it is biased towards the upper positions of the guide slots 210 by the elastic restoring force of the elastic spring 350, which is connected to the release lever unit 300.

Figure 7:
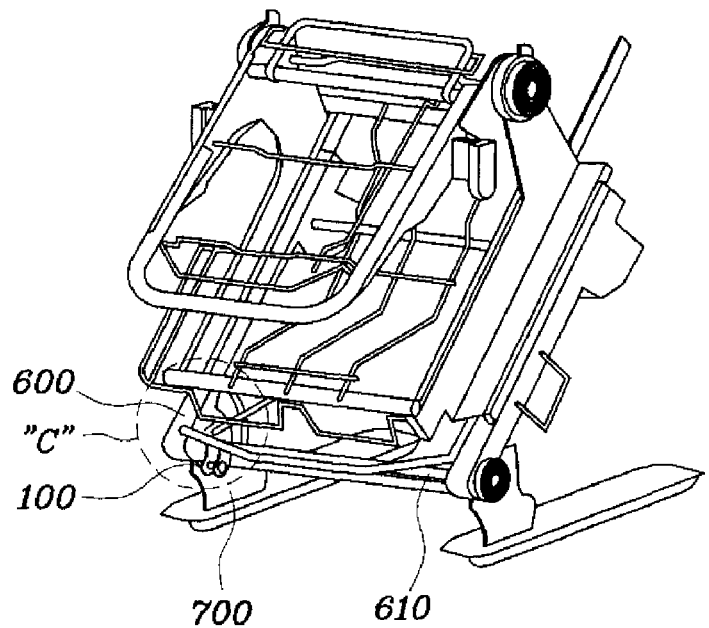
FIG. 7 is a view showing the state of the double-folding seat having the locking apparatus when it is being double-folded according to the present invention.
Figure 8:
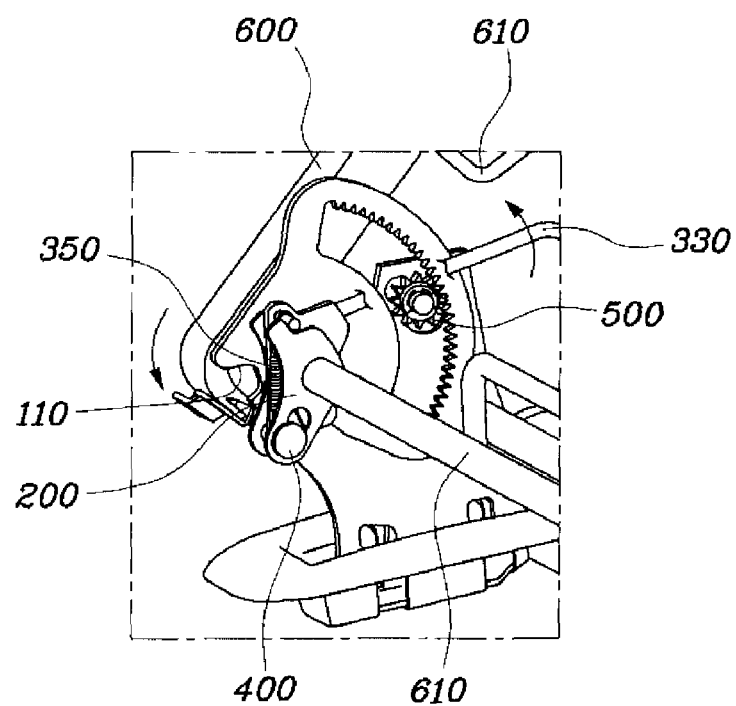
FIG. 8 is an enlarged view of a circled portion "C" of FIG. 7.

As shown in FIGS. 7 and 8, while the seat frame 600 is folded, the latch plate 100 is rotated by the rotation of the seat frame 600, and the pinion gear 500, which engages with the rack gear 120 of the latch plate 100, is rotated.

Figure 9:
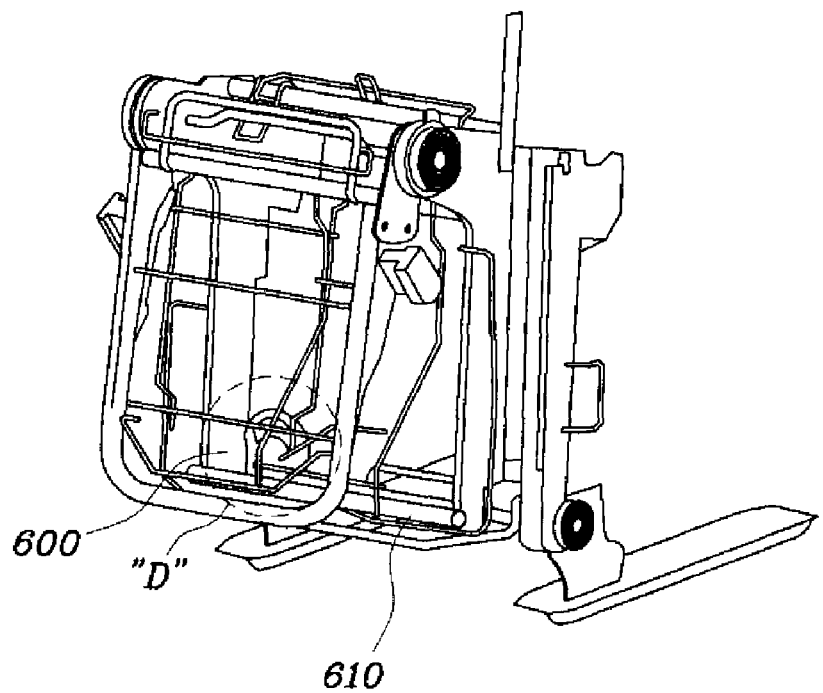
FIG. 9 is a view showing the state in which the double-folding seat is locked by the locking apparatus when it is completely double-folded according to the present invention.
Figure 10:
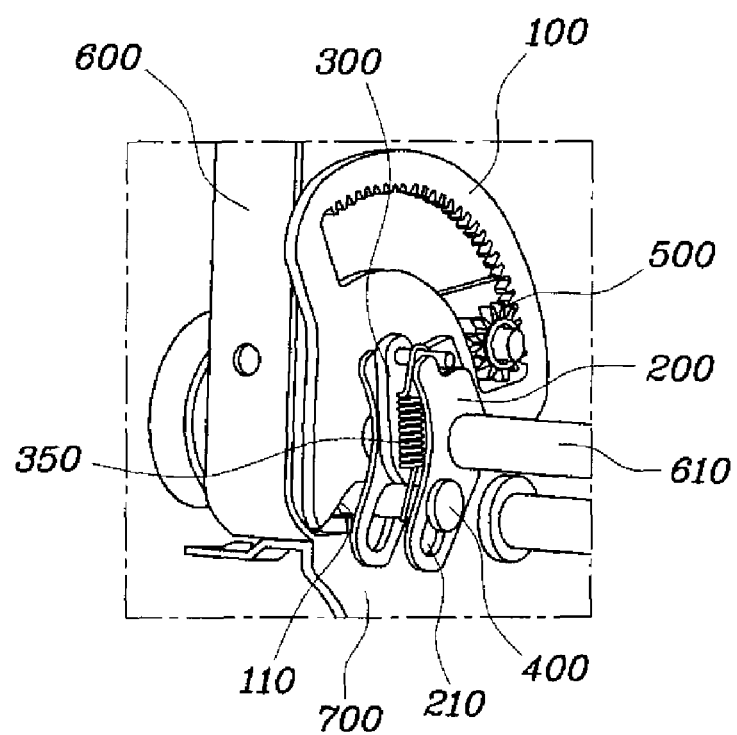
FIG. 10 is an enlarged view of a circled portion "D" of FIG. 9.

As shown in FIGS. 9 and 10, when the seat frame 600 is completely folded, the locking notch 110 of the latch plate 100 is disposed at a position corresponding to the locking pin 400 by the rotation of the latch plate 100. At this time, the locking pin 400 is moved to the upper positions of the guide slots 210 by the elastic restoring force of the elastic spring 350 and is inserted into the locking notch 110. Thereby, the locking of the locking pin 400 to the locking notch 110 of the latch plate 100 is realized. Here, referring to FIG. 4, in the process of folding the seat frame 600, the angle at which the seat frame 600 is folded is limited by the stopper 800.

Figure 11A:
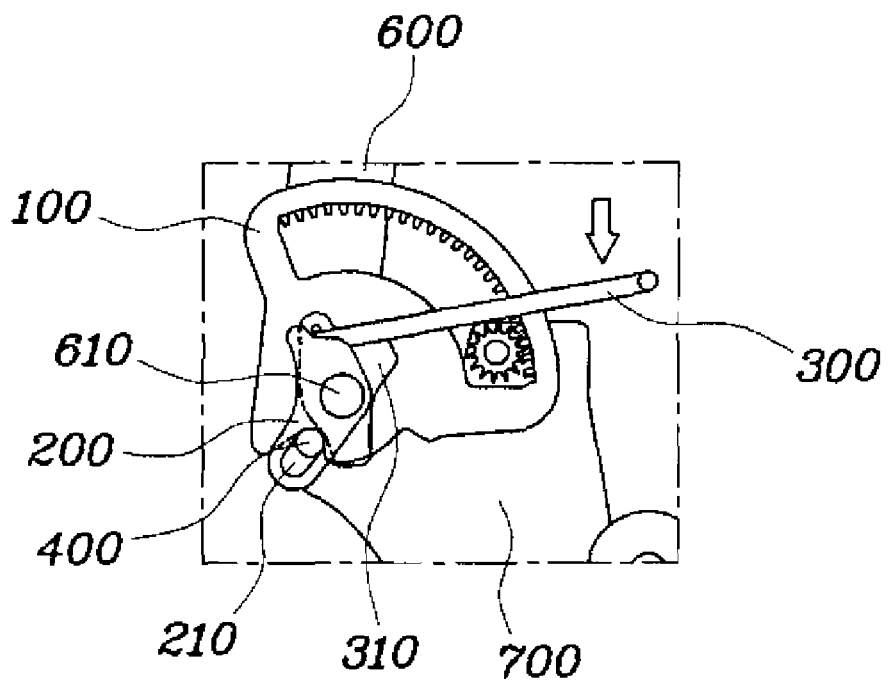
FIGS. 11A through 11C are views illustrating an exemplary process of releasing the locking apparatus from the locked state after the double-folding seat has been double-folded according to the present invention.
Figure 11B:
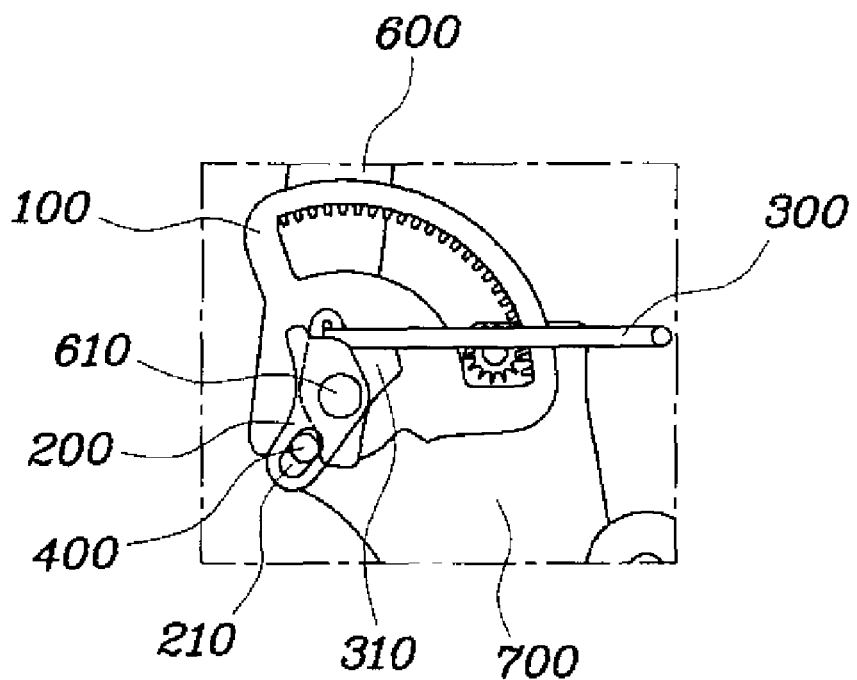
Figure 11C:
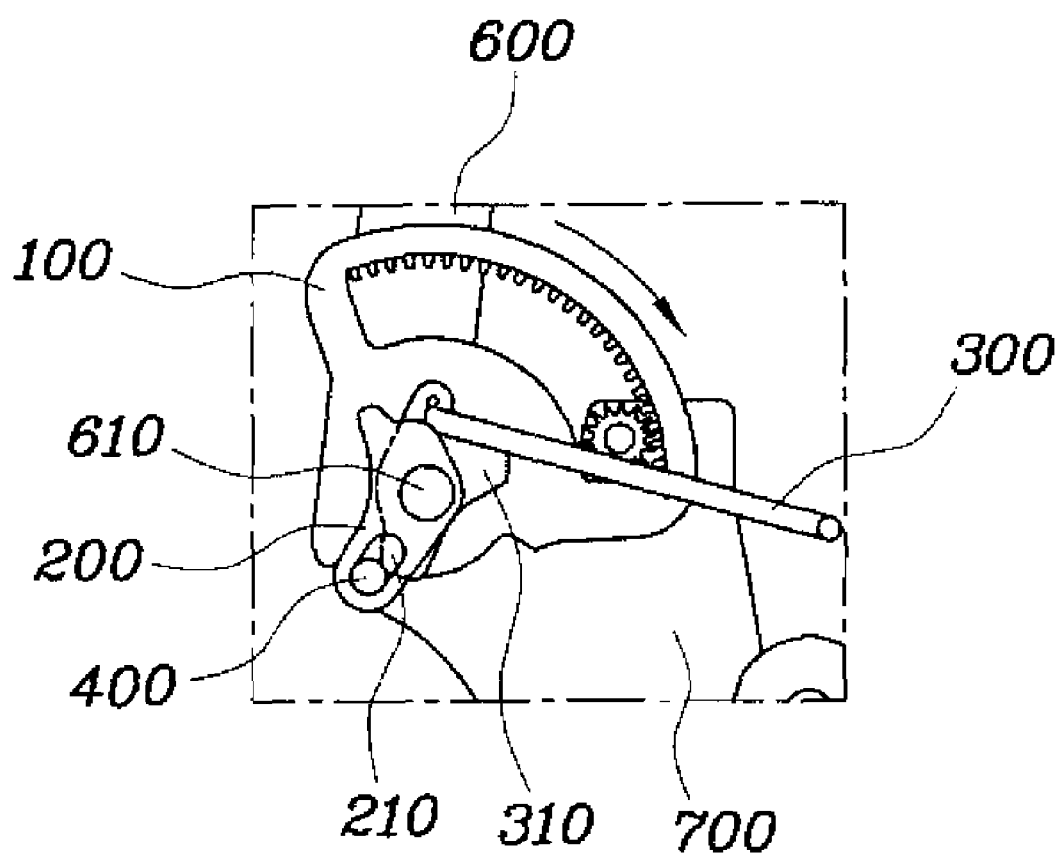

As shown in FIGS. 11A through 11C, to release the locked state of the seat frame 600, the lever 330 is first rotated in the direction opposite the direction in which the seat frame 600 is folded. Then, the lever plate 310 is also rotated by the rotation of the lever 330 in the direction opposite the direction in which the seat frame 600 is folded. Here, the trigger portion of the lever plate 310, which rotates, pushes the locking pin 400 outwards along the guide slot 210, which has been locked to the locking notch 110 of the latch plate 100, so that the locking pin 400 is removed from the locking notch 110.

As a result, the locked state of the seat frame 600 is released, and the seat frame 600 enters the state in which it can be returned to the original position thereof.

As described above, the present invention makes the operation of locking or unlocking a double-folded seat easy, thus enhancing the manipulability of the product. Furthermore, in the present invention, the speed at which the seat is double-folded can be maintained constant, thus facilitating manipulation, thereby being more convenient to a user.

As well, the present invention does not require a seat strap for preventing the double-folded seat from undesirably moving. Therefore, the appearance of a passenger compartment can be enhanced by the elimination of the seat strap.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for locking a double-folding seat for vehicles, comprising:
   a latch plate firmly fastened to a seat frame which is rotatably coupled to a base bracket, the latch plate having a locking notch formed at a predetermined position thereof;
   a guide unit firmly fastened to a folding shaft at a position spaced apart from the latch plate, the guide unit including a guide slot;
   a release lever unit rotatably coupled to the folding shaft; and
   a locking pin slidably inserted into the guide slot of the guide unit, the locking pin being elastically connected to the release lever unit such that the locking pin is locked to the locking notch of the latch plate when the seat frame is folded, but when the release lever unit is rotated, the release lever unit moves out the locking pin from the locking notch of the latch plate, so that the locking pin is released from the locking notch.

2. The apparatus for locking the double-folding seat for vehicles as set forth in claim 1, wherein the release lever unit comprises:
   a lever plate rotatably provided on the folding shaft;
   a support pin formed on the lever plate and being connected to the locking pin through an elastic spring; and
   a lever extending outwards from one end portion of the lever plate.

3. The apparatus for locking the double-folding seat for vehicles as set forth in claim 1, wherein a rack gear is provided in the latch plate, and a pinion gear is rotatably provided on the base bracket, the pinion gear engaging with the rack gear.

4. The apparatus for locking the double-folding seat for vehicles as set forth in claim 3, wherein the rack gear is formed on the latch plate in a predetermined distance from the folding shaft in a rotational direction thereof.

5. The apparatus for locking the double-folding seat for vehicles as set forth in claim 1, wherein a stopper is provided on the base bracket to limit a rotation angle of the seat frame at which the seat frame is folded.

6. The apparatus for locking the double-folding seat for vehicles as set forth in claim 1, wherein a retainer is provided on an end portion of the locking pin to prevent the locking pin from releasing from the guide unit.

7. An apparatus for locking the double-folding seat for vehicles, comprising:
   a latch plate firmly fastened to a seat frame which is rotatably coupled to a base bracket, the latch plate having a locking notch formed at a predetermined position in the latch plate;
   a guide unit firmly fastened to a folding shaft, wherein the guide unit is locked to the latch plate by rotation of the seat frame; and
   a release lever unit rotatably coupled to the folding shaft, wherein the guide unit is unlocked from the latch plate by rotation of the release lever unit;
   wherein the guide unit comprises:
      a guide slot formed in a radial direction from the folding shaft; and
      a locking pin slidably inserted into the guide slot and elastically biased toward the folding shaft by an elastic member, wherein the locking pin is locked to the locking notch of the latch plate by the elastic member when the seat frame is rotated with a predetermined degree so as to fold the seat frame but when the release lever unit is rotated, the release lever unit releases the locking pin from the locking notch of the latch plate.

8. The apparatus for locking the double-folding seat for vehicles as set forth in claim 7, wherein the latch plate is firmly fastened to the seat frame through a bushing enclosing a portion of the folding shaft in the base bracket.

9. The apparatus for locking the double-folding seat for vehicles as set forth in claim 7, wherein the locking notch is formed on the latch plate in a predetermined distance from the folding shaft in a radial direction thereof.

10. The apparatus for locking the double-folding seat for vehicles as set forth in claim 7, the locking pin and the release lever unit is connected by the elastic member.

11. The apparatus for locking the double-folding seat for vehicles as set forth in claim 7, wherein the elastic member is a spring.

12. The apparatus for locking the double-folding seat for vehicles as set forth in claim 7, wherein a retainer is provided on an end of the locking pin to prevent the locking pin from releasing from the guide unit.

13. The apparatus for locking the double-folding seat for vehicles as set forth in claim 7, wherein the release lever unit comprises:

a lever plate rotatably provided on the folding shaft; and
a lever extending outwards from one end portion of the lever plate.

14. The apparatus for locking the double-folding seat for vehicles as set forth in claim 13, wherein a support pin is formed to the lever plate, the support pin and the locking pin being connected by an elastic member.

15. The apparatus for locking the double-folding seat for vehicles as set forth in claim 7, wherein a rack gear is provided in the latch plate, and a pinion gear is rotatably provided on the base bracket, the pinion gear engaging with the rack gear.

16. The apparatus for locking the double-folding seat for vehicles as set forth in claim 15, wherein the rack gear is formed on the latch plate in a predetermined distance from the folding shaft in a rotational direction thereof.

17. The apparatus for locking the double-folding seat for vehicles as set forth in claim 7, wherein a stopper is provided on the base bracket to limit a rotation angle of the seat frame at which the seat frame is folded.

18. A passenger vehicle comprising the apparatus for locking the double-folding seat for vehicles as set forth in claim 7.

\* \* \* \* \*